(12) United States Patent
Hirota et al.

(10) Patent No.: US 7,844,458 B2
(45) Date of Patent: Nov. 30, 2010

(54) SPEECH RECOGNITION FOR DETECTING SETTING INSTRUCTIONS

(75) Inventors: Makoto Hirota, Tokyo (JP); Hiroki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1066 days.

(21) Appl. No.: 11/554,086

(22) Filed: Oct. 30, 2006

(65) Prior Publication Data

US 2007/0100636 A1    May 3, 2007

(30) Foreign Application Priority Data

Nov. 2, 2005    (JP)    ............................... 2005-320009

(51) Int. Cl.
*G10L 15/22* (2006.01)
*G06F 3/16* (2006.01)
(52) U.S. Cl. .................. 704/252; 704/275; 715/727
(58) Field of Classification Search ................ 704/235, 704/236, 251, 252, 255, 270, 275; 715/727, 715/729
See application file for complete search history.

(56) References Cited

U.S. PATENT DOCUMENTS

| | | | | |
|---|---|---|---|---|
| 5,748,974 A * | 5/1998 | Johnson | .......................... | 704/9 |
| 6,253,184 B1 * | 6/2001 | Ruppert | ...................... | 704/275 |
| 6,587,820 B2 * | 7/2003 | Kosaka et al. | ................ | 704/257 |
| 6,633,844 B1 * | 10/2003 | Verma et al. | ................ | 704/251 |
| 6,654,720 B1 * | 11/2003 | Graham et al. | .............. | 704/270 |
| 6,747,678 B1 * | 6/2004 | Katayama et al. | ............ | 715/773 |
| 6,823,308 B2 * | 11/2004 | Keiller et al. | ................ | 704/256 |
| 7,069,215 B1 * | 6/2006 | Bangalore et al. | ............ | 704/255 |
| 7,136,909 B2 * | 11/2006 | Balasuriya | ................... | 709/220 |
| 7,330,868 B2 * | 2/2008 | Kawasaki et al. | ............ | 708/672 |
| 7,362,465 B2 * | 4/2008 | Nishikawa et al. | ......... | 358/1.16 |
| 7,363,224 B2 * | 4/2008 | Huang et al. | ................ | 704/252 |
| 7,383,189 B2 * | 6/2008 | Halonen et al. | .............. | 704/275 |
| 7,421,655 B2 * | 9/2008 | Ikeda et al. | ................... | 715/710 |
| 7,584,427 B2 * | 9/2009 | Machida et al. | ............. | 715/713 |
| 2003/0020760 A1 * | 1/2003 | Takatsu et al. | .............. | 345/810 |
| 2003/0112277 A1 * | 6/2003 | Shteyn | ....................... | 345/773 |
| 2004/0136023 A1 * | 7/2004 | Sato | .......................... | 358/1.13 |
| 2004/0172258 A1 * | 9/2004 | Dominach et al. | .......... | 704/277 |
| 2005/0018658 A1 * | 1/2005 | Ikeda et al. | ................... | 370/352 |
| 2005/0139673 A1 * | 6/2005 | Yokoyama | ................... | 235/454 |
| 2005/0283364 A1 * | 12/2005 | Longe et al. | ................ | 704/257 |
| 2007/0005371 A1 * | 1/2007 | Nakagawa et al. | .......... | 704/275 |
| 2008/0028327 A1 * | 1/2008 | Hirota et al. | ................ | 715/762 |
| 2010/0134677 A1 * | 6/2010 | Yamamoto et al. | ..... | 348/333.01 |

FOREIGN PATENT DOCUMENTS

| | | |
|---|---|---|
| JP | 06-282569 | 10/1994 |
| JP | 2993872 | 10/1999 |

* cited by examiner

*Primary Examiner*—Martin Lerner
(74) *Attorney, Agent, or Firm*—Cowan, Liebowitz & Latman, P.C.

(57) ABSTRACT

A speech recognition apparatus that enables efficient multimodal input in setting a plurality of items by one utterance is provided. An input unit inputs a setting instruction by speech. A speech interpretation unit recognizes and interprets the contents of the setting instruction by speech to generate first structured data containing candidates of the interpretation result. An instruction input detecting unit detects a setting instruction input by a user. An instruction input interpretation unit interprets the contents of the setting instruction input to generate second structured data. A selection unit selects one of the interpretation candidates contained in the first structured data based on the second structured data.

12 Claims, 16 Drawing Sheets

F I G. 1
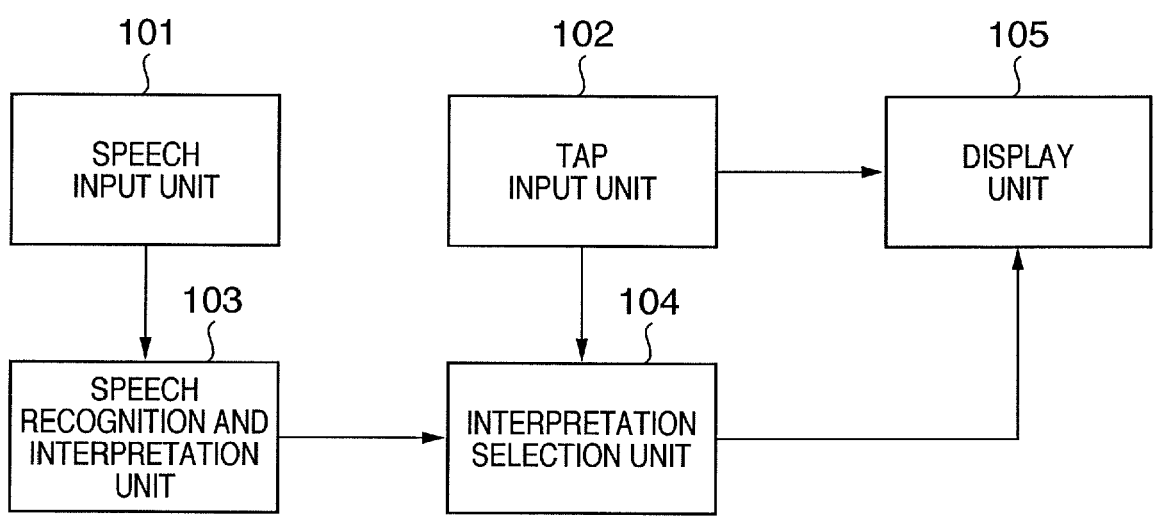

FIG. 10

| START | 00:00:05:00 | | | |
|---|---|---|---|---|
| END | 00:00:07:00 | | | |
| SPEECH INTERPRETATION | TOP-RANKED (70) | SCALING FACTOR | A4→A3 |
| | | NUMBER OF COPIES | 3 |
| | SECOND-RANKED (60) | PAPER SIZE | A4 |
| | | NUMBER OF COPIES | 3 |
| | THIRD-RANKED (45) | PAPER SIZE | A3 |
| | | NUMBER OF COPIES | 3 |

FIG. 11

| 110 | START | 00:00:05:20 | | |
|---|---|---|---|---|
| | END | 00:00:05:20 | | |
| | TAP INTERPRETATION | TOP-RANKED | PAPER SIZE | ? |

| 120 | START | 00:00:06:30 | | |
|---|---|---|---|---|
| | END | 00:00:06:30 | | |
| | TAP INTERPRETATION | TOP-RANKED | NUMBER OF COPIES | ? |

SPEECH RECOGNITION FOR DETECTING SETTING INSTRUCTIONS

BACKGROUND OF THE INVENTION

1. Field of the Invention

The present invention relates to a speech recognition apparatus and, more particularly, to a speech recognition apparatus using a multimodal user interface that is a combination of a graphical user interface (GUI) and a speech user interface (UI).

2. Description of the Related Art

Recent development of the speech recognition technology and improvement of hardware performance of speech recognition devices are enabling speech input in various computer-controlled devices such as car navigation systems, portable phones, and FAX apparatuses except personal computers and workstations.

Speech input generally provides the following merits.

(1) It allows a user to input without seeing the screen or using hands.

(2) It allows direct setting of items that are not displayed on the screen.

(3) It allows a user to set a plurality of items by one utterance.

Assume that a user wants to do copy setting in a copy machine to print a document on A4 sheets in quintuplicate. A normal GUI or UI based on key input makes the user to execute a plurality of steps, i.e., input the number of copies by using the ten-key pad, press the paper size button on the screen, and press the "A4" key on the screen.

With speech input, the user can set the paper size by only uttering "A4", and this eliminates the user's effort required to display the paper size setting window as described in merit (2).

The user can also set the paper size and the number of copies at once by uttering, e.g., "A4, five copies" as described in merit (3).

There are also proposed techniques of increasing the operation efficiency by using multimodal input that combines GUI and speech instead of simply using GUI input or speech input (e.g., Japanese Patent Registration No. 2993872 and Japanese Patent Laid-Open No. 6-282569).

Although speech input has various merits, it also has a demerit of "misrecognition". For example, even when the user utters "A4", the speech recognition apparatus may misrecognize it as "A3".

Even if the user utters "A4, five copies", it may be misrecognized as "A4 to B5". In this case, although the user wants to set two items, i.e., the paper size and the number of copies at once, the apparatus misrecognizes it as setting of one item "scaling factor". The misrecognition of the item itself greatly confuses the user, who must then make much effort to correct the error.

The conventional GUI operation often uses hierarchical steps, i.e., makes the user select a setting item by a key and then set the detailed value of the setting item. This operation method can avoid misrecognition of the setting item itself, unlike speech input. However, the need to execute the plurality of steps increases the load on the user, as described above.

Even in multimodal input combining a GUI and speech input, a method using natural language analysis for speech input by a natural language, like Japanese Patent Registration No. 2993872, is susceptible to somewhat low accuracy of natural language analysis.

SUMMARY OF THE INVENTION

In view of the above problems in the conventional art, the present invention has an object to provide a speech recognition apparatus that enables efficient multimodal input by suppressing misrecognition in setting a plurality of items by one utterance.

According to one aspect of the present invention, a speech recognition apparatus for allowing setting by speech is provided. An input unit inputs a setting instruction by speech. A speech interpretation unit recognizes and interprets the contents of the setting instruction by speech to generate first structured data containing candidates of the interpretation result. An instruction input detecting unit detects a setting instruction input by a user. An instruction input interpretation unit interprets the contents of the setting instruction input to generate second structured data. A selection unit selects one of the interpretation candidates contained in the first structured data based on the second structured data.

Further features of the present invention will become apparent from the following description of exemplary embodiments with reference to the attached drawings.

BRIEF DESCRIPTION OF THE DRAWINGS

FIG. 1 is a block diagram showing the arrangement of a multimodal input section in a copy machine according to an embodiment of the present invention;

FIG. 10 is a view showing an example of structured data output from the speech recognition and interpretation unit according to the embodiment;

FIG. 11 is a view showing an example of structured data output from the tap input unit according to the embodiment;

DESCRIPTION OF THE EMBODIMENTS

Figure 2:
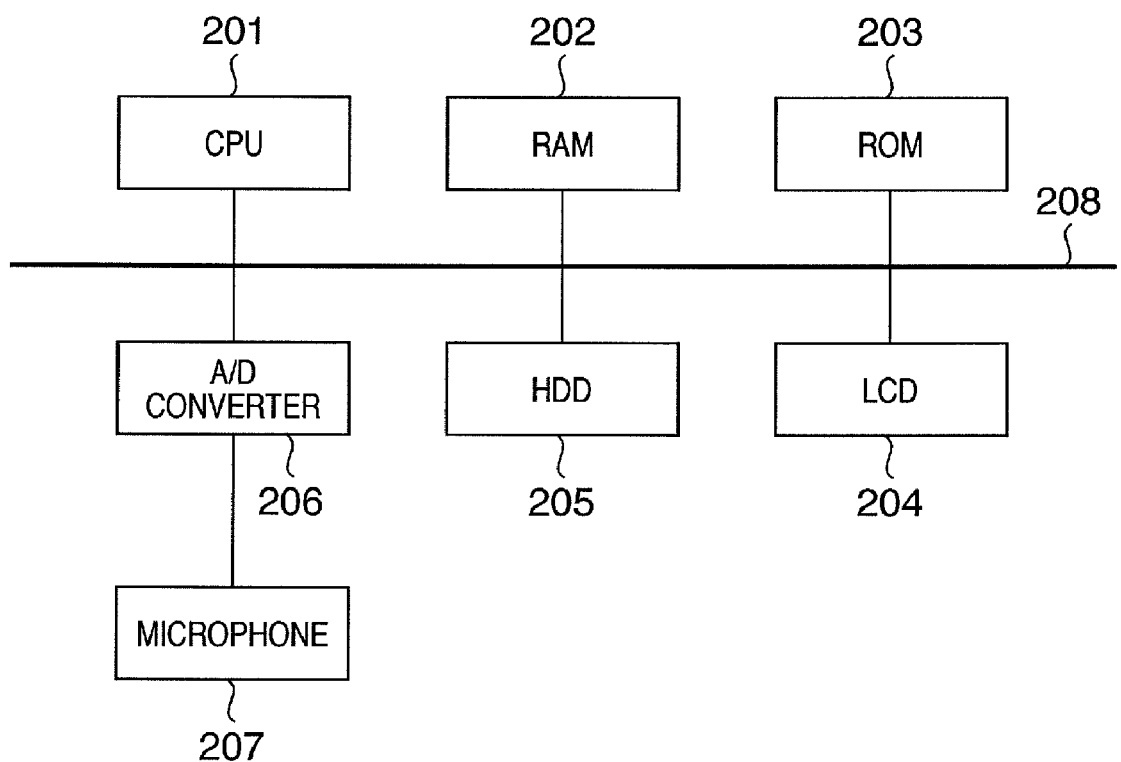
FIG. 2 is a block diagram showing the hardware configuration of the copy machine according to the embodiment.

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

In this embodiment, an example will be described in which setting of copy processing in a copy machine is done by speech input and touch panel input.

FIG. 1 is a block diagram showing the arrangement of a multimodal input processing section in a copy machine according to this embodiment. Referring to FIG. 1, reference numeral 101 denotes a speech input unit; 102, a tap input unit which enables a pointing operation by a user; 103, a speech recognition and interpretation unit; and 104, an interpretation selection unit. A display unit 105 controls display of a GUI in this embodiment.

FIG. 2 is a block diagram showing the hardware configuration of the copy machine according to this embodiment. A CPU 201 operates in accordance with a program that implements the operation procedures (to be described later) of the copy machine according to this embodiment. A RAM 202 provides the work area of the CPU 201. A ROM 203 stores, e.g., programs that implement the operation procedures of the program. An LCD (Liquid Crystal Display) 204 enables tap input by a user. Reference numeral 205 denotes a hard disk. An A/D converter 206 converts an input speech into a digital signal. Reference numeral 207 denotes a microphone for speech input; and 208, a bus.

FIGS. 6 to 9 show examples of the GUI displayed on the LCD 204 of the copy machine. FIGS. 6 to 9 show a screen with keys of setting items "number of copies", "paper size", "double-side print", and "scaling factor" arranged on the left side.

Figure 6:
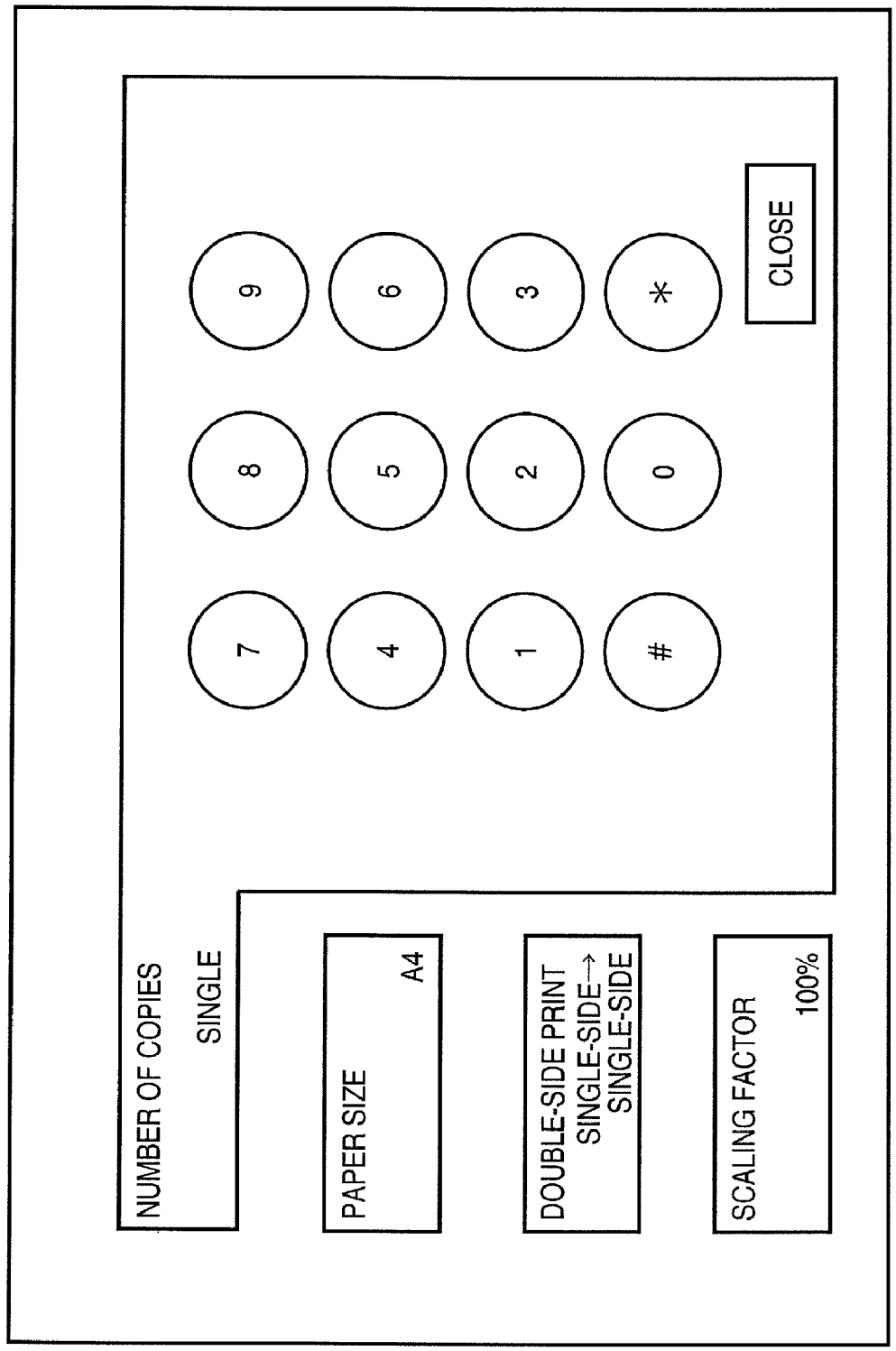
FIG. 6 is a view showing an example of screen display according to the embodiment.

When the user taps the "number of copies" button, a ten-key input panel to set the number of copies appears, as shown in FIG. 6. The user can input a numerical value representing the number of copies by appropriately tapping the ten-key pad. The input result is displayed at the lower right corner of the "number of copies" button.

Figure 7:
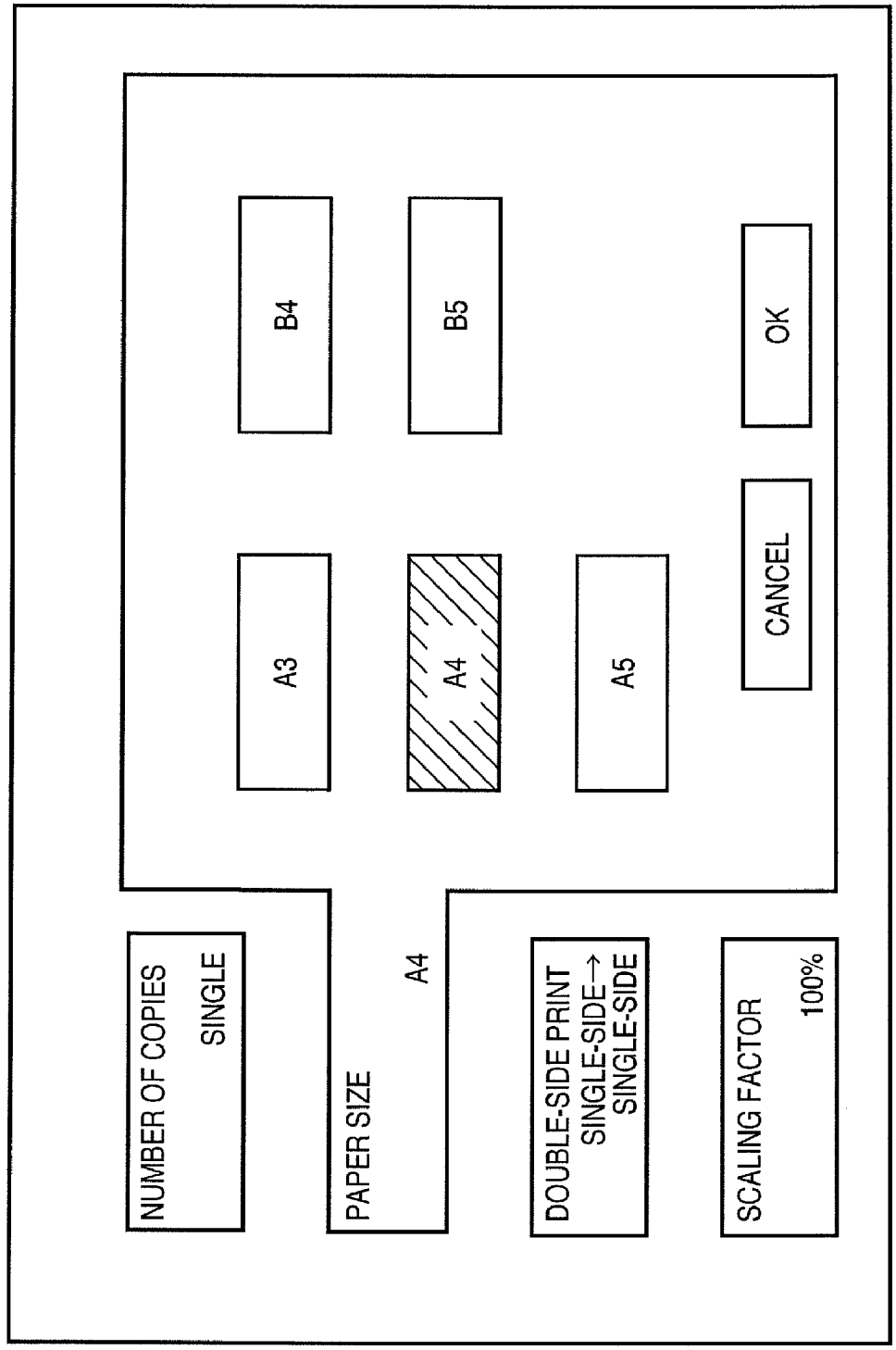
FIG. 7 is a view showing another example of screen display according to the embodiment.
Figure 8:
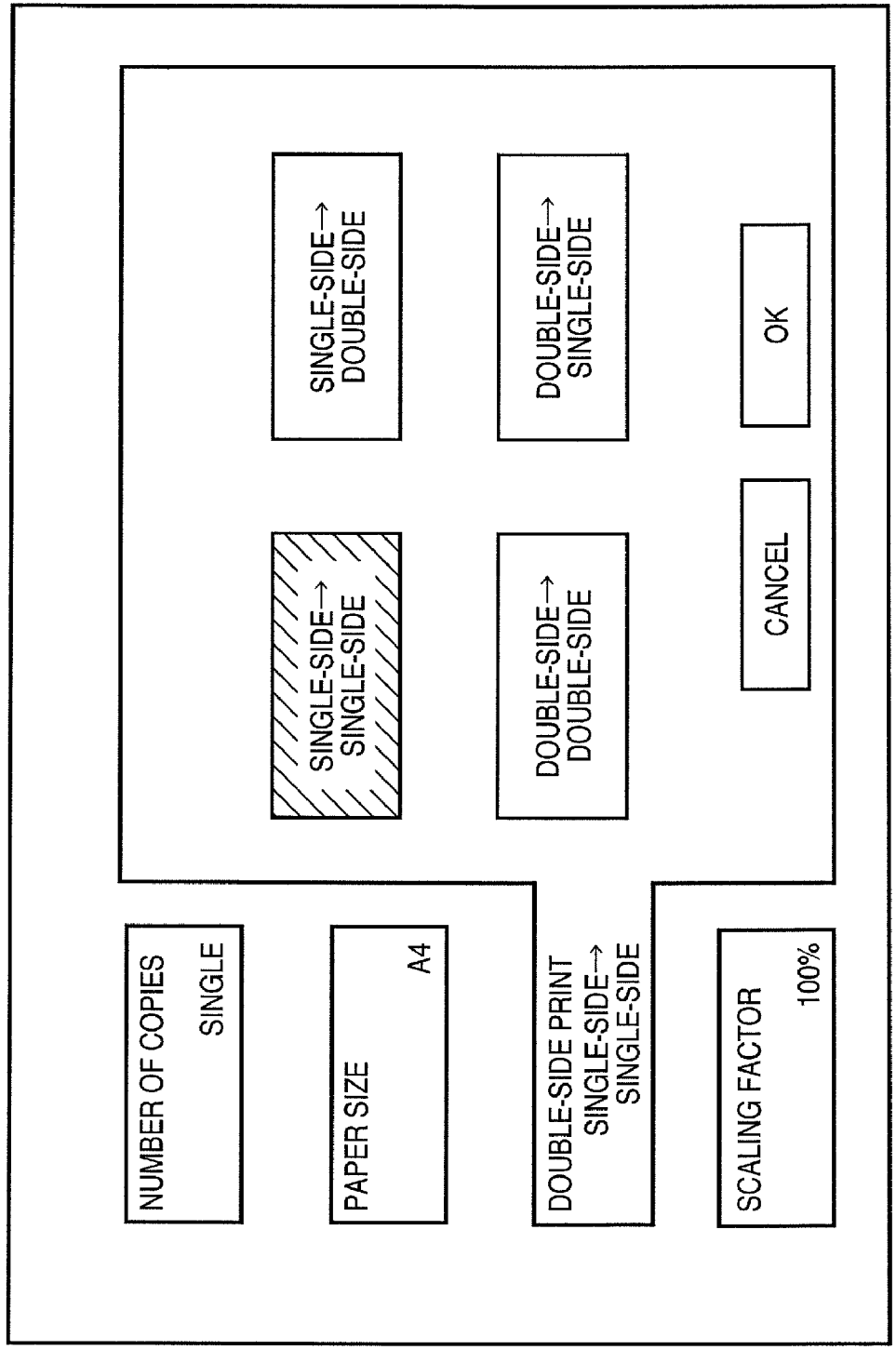
FIG. 8 is a view showing still another example of screen display according to the embodiment.
Figure 9:
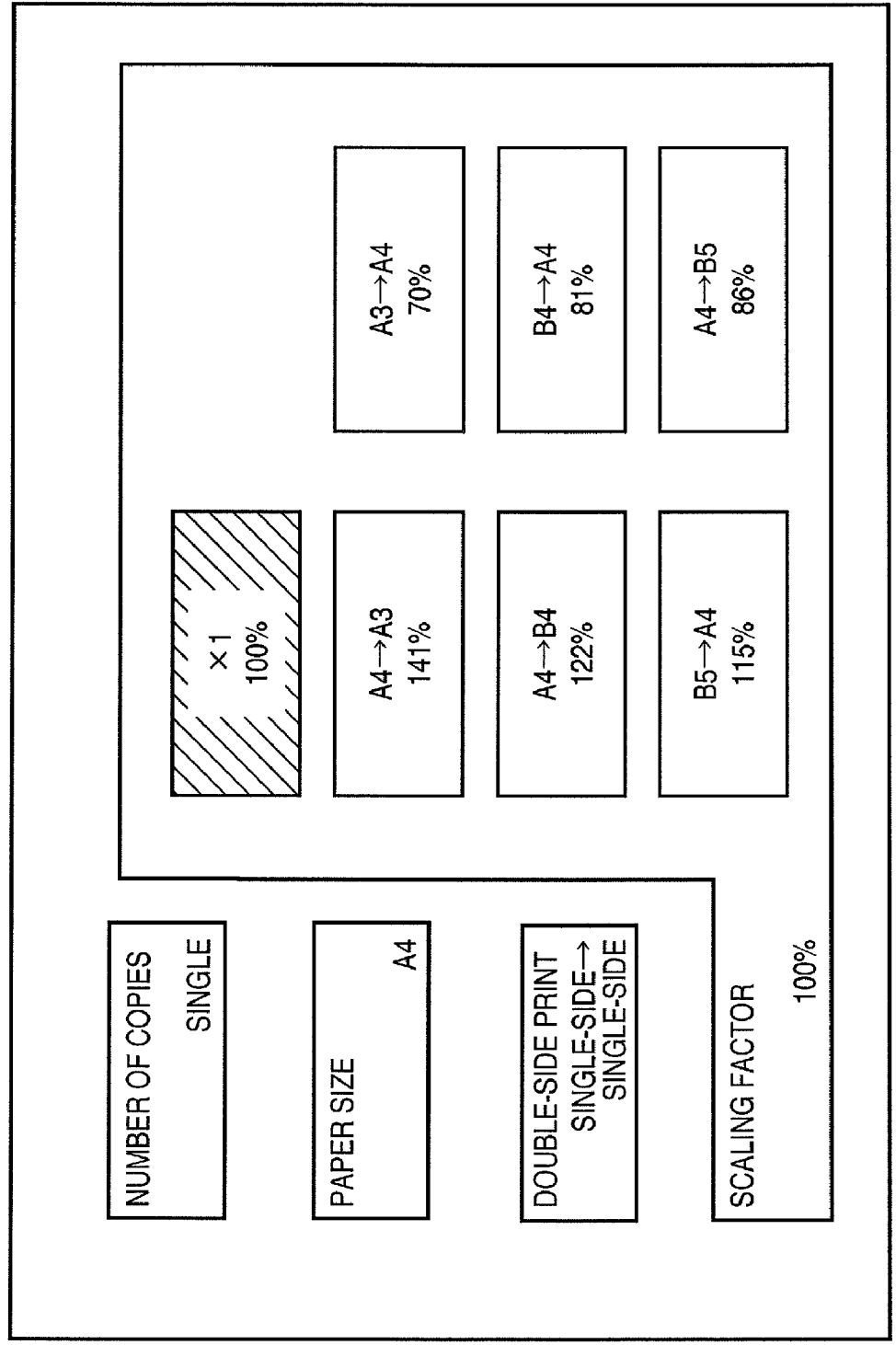
FIG. 9 is a view showing still another example of screen display according to the embodiment.

FIGS. 7, 8, and 9 show screen examples displayed by tapping the "paper size" button, "double-side print" button, and "scaling factor" button, respectively.

As a characteristic feature of this embodiment, a plurality of items are efficiently input by using not only tap input on the LCD 204 but also speech input. An example will be described in which the user utters "A4, three copies" simultaneously while tapping the "paper size" button and "number of copies" button successively on the LCD 204 that displays windows shown in FIGS. 6 to 9.

Figure 3:
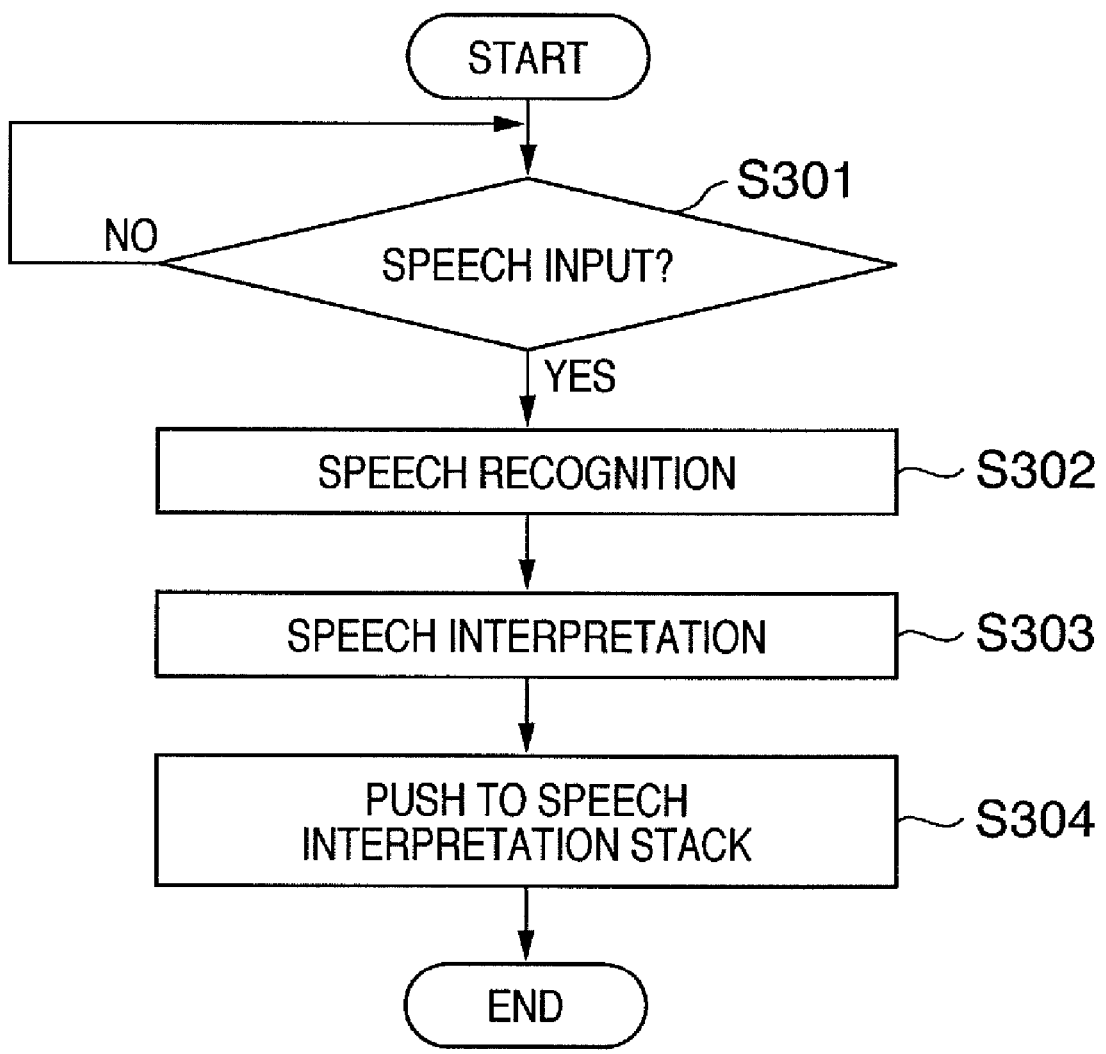
FIG. 3 is a flowchart showing the operation of a speech recognition and interpretation unit according to the embodiment.

FIG. 3 is a flowchart showing the operations of the speech input unit 101 and speech recognition and interpretation unit 103.

The speech input unit 101 checks whether the user has input speech (S301). Speech input is generally detected on the basis of, e.g., the power of input speech. This is a known technique, and a detailed description thereof will be omitted. If YES in step S301, the speech recognition and interpretation unit 103 recognizes the input speech information (S302) and interprets the speech (S303). Speech recognition is a process of converting input speech into a character string. Speech interpretation is a process of converting the recognition result into predetermined structured data. When the user utters, e.g., "A4, three copies", the speech is recognized, and "A4, three copies" is output by speech recognition processing (S302). This result is then converted into structured data containing a pair of an item name and an item value, {paper: A4;
number of copies: 3;} by speech interpretation processing (S303).

The process of recognizing and interpreting input speech and outputting it as structured data can be implemented by using an existing technology. The speech recognition and interpretation processing can use a grammatical rule described in, e.g., the speech recognition grammar specification SRGS or speech interpretation rule specification SISR of W3C (=World Wide Web Consortium).

Speech recognition processing can generally output top N results in descending order of likelihood (recognition score), instead of outputting only one result. Hence, N structured data of interpretation results can also be output.

FIG. 10 shows an example of structured data obtained by recognizing and interpreting input speech "A4, three copies". Referring to FIG. 10, "START" indicates the input speech start time, and "END" indicates the input speech end time. The "speech interpretation" field contains interpretation results. In this example, the field contains top three interpretation results each having a pair of an item name and an item value. The items are arranged in the order of utterance time in the input speech. For example, the top-ranked interpretation in FIG. 10 is "A3 to A4, three copies". In this case, the apparatus recognizes that the user has uttered "scaling factor" ahead of "number of copies", and the items are arranged in this order. The likelihood of each speech recognition decides the order of interpretation candidates. Each interpretation candidate contains likelihood information (e.g., 70 for the top-ranked interpretation), as indicated in parentheses on the lower side of ranking in FIG. 10.

The speech interpretation result is pushed to the speech interpretation stack provided in, e.g., the RAM 202 (step S304).

In the example shown in FIG. 10, the top-ranked interpretation is a recognition error. The second-ranked interpretation result is correct. Hence, the user input is erroneously interpreted if only speech input is used. This embodiment executes tap input on the LCD 204 to prevent such recognition error.

Figure 4:
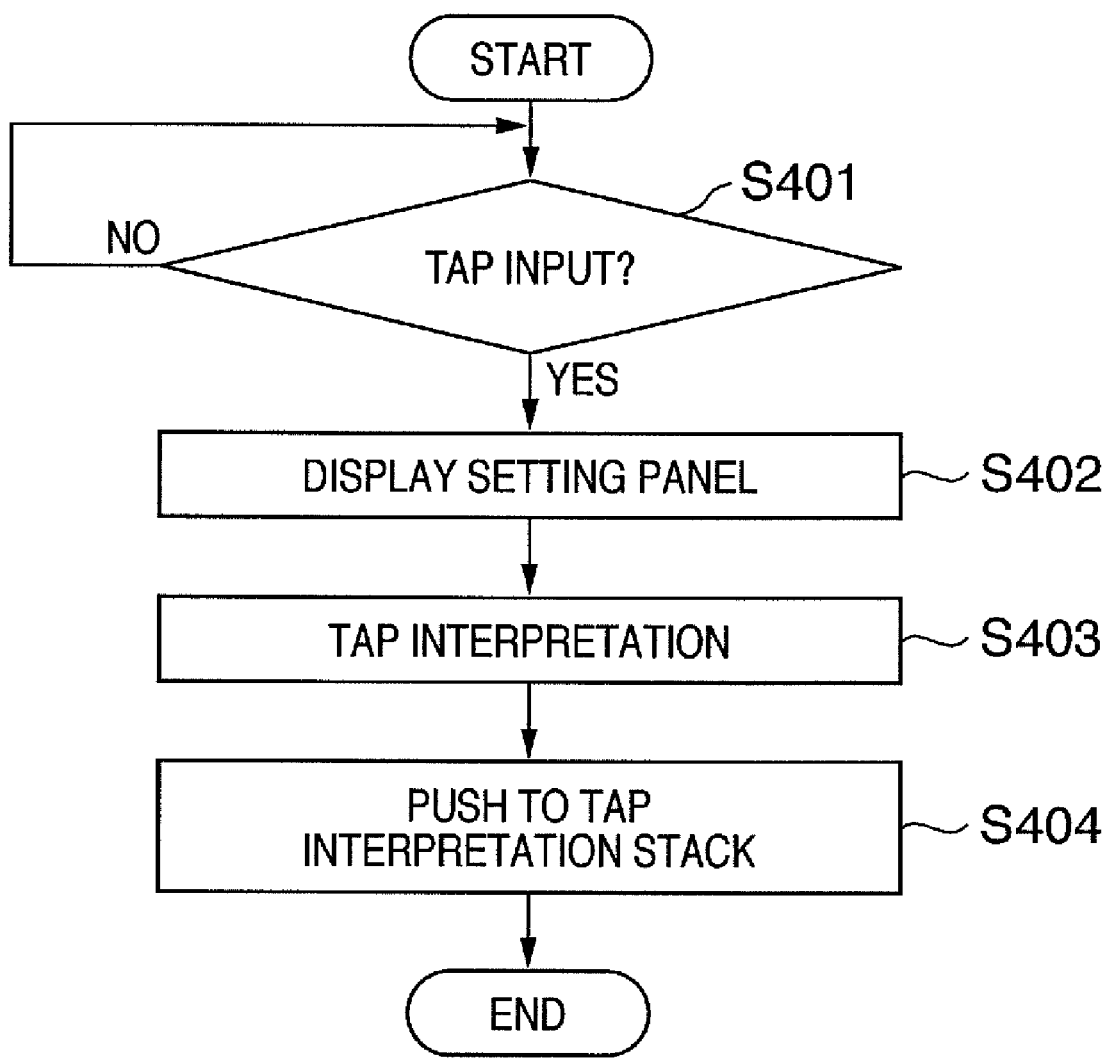
FIG. 4 is a flowchart showing the operation of a tap input unit according to the embodiment.

FIG. 4 is a flowchart showing the operation of the tap input unit 102 according to this embodiment. The tap input unit 102 checks whether the user has done tap input (S401). If YES in step S401, and the button tapped by the user is any one of the "number of copies" button, "paper size" button, "double-side print" button, and "scaling factor" button, a set panel corresponding to the tapped key is displayed (S402). For example, if the user taps the "paper size" button, the LCD 204 displays a paper size set panel shown in FIG. 7.

Next, the tap input is interpreted (S403). This interpretation indicates output of data expressing that "setting item is XXX" by using the same structured data format as in the above-described speech interpretation. When the user taps the "paper size" button, data 110 shown in FIG. 11 is obtained as interpretation data. Since tap input is free from ambiguity, unlike speech input, the interpretation data, i.e., data 110 contains only the top-ranked interpretation result. "START" and "END" time stamps record the tap time. The setting item of the data 110 is "paper size", and its value (i.e., the number of sheets) is represented by "?" because this tap input alone cannot define it.

The tap interpretation result is pushed to the tap interpretation stack provided, e.g., the RAM 202 (step S404).

If the user taps the "paper size" button and "number of copies" button successively, the tap interpretation stack holds data 120 next to the data 110, as shown in FIG. 11. That is, two interpretation result data are held.

Upon the processing described above with reference to the flowcharts in FIGS. 3 and 4, the stacks hold a plurality of speech interpretation results and tap interpretation results based on a user instruction. In this embodiment, the interpretation selection unit 104 selects optimum results from the interpretation results.

Figure 5:
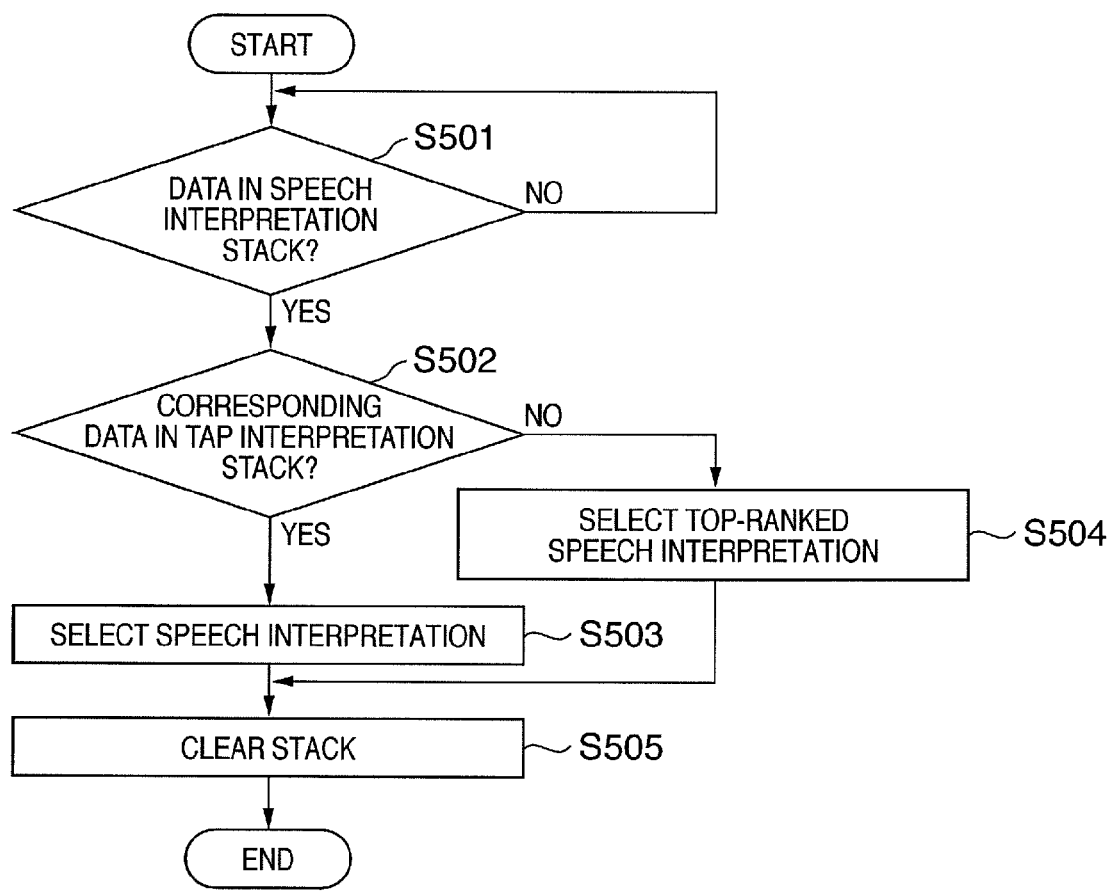
FIG. 5 is a flowchart showing the operation of an interpretation selection unit according to the embodiment.
Figure 12:
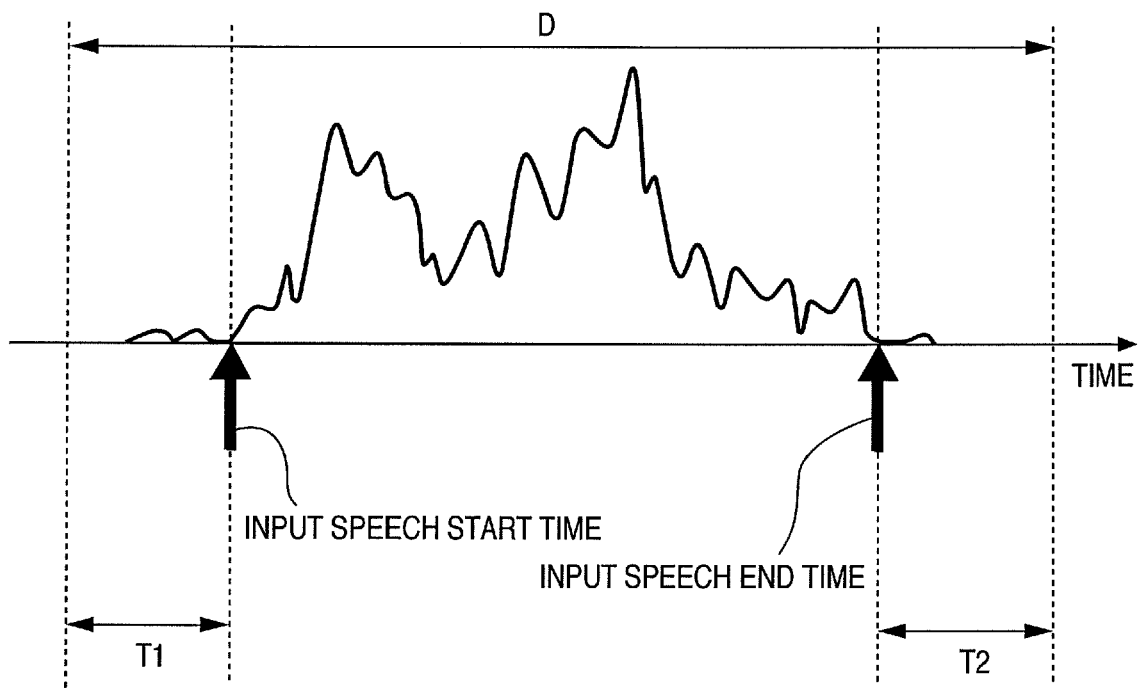
FIG. 12 is a timing chart for explaining the correspondence between an input speech and tap input according to the embodiment.

FIG. 5 is a flowchart showing the operation of the interpretation selection unit 104. The interpretation selection unit 104 always monitors the speech interpretation stack and checks whether the stack holds speech interpretation data (S501). If YES in step S501, the interpretation selection unit 104 checks whether the tap interpretation stack holds tap interpretation data corresponding to the speech interpretation data (S502). Whether tap interpretation data corresponds to speech interpretation data is determined first on the basis of the time stamp. More specifically, as shown in FIG. 12, let D be the period from T1 sec before the input speech start time to T2 sec after the end time. If the period D includes the time stamp of the tap interpretation data, the tap interpretation data is regarded as data corresponding to the speech interpretation data. Both the two tap interpretation data 110 and 120 shown in FIG. 11 are regarded as data corresponding to the speech interpretation data shown in FIG. 10. That tap interpretation data corresponds to speech interpretation data indicates that the user has input the speech and tap simultaneously.

If YES in step S502, the interpretation selection unit 104 selects, from the N interpretation candidates contained in the speech interpretation data, one interpretation candidate that most matches the tap interpretation data (S503). The matching degree is determined on the basis of the degree of matching between items. For example, the chronological order of the items contained in the tap interpretation data 110 and 120 in FIG. 11 is "paper size" and "number of copies". Of the three speech interpretation data candidates in FIG. 10, the second- and third-ranked candidates have the items "paper size" and "number of copies" in this order. The interpretation selection unit 104 selects the candidate of higher ranking, i.e., the second-ranked interpretation candidate. That is, the apparatus interprets that the value of "paper size" is "A4", and the "number of copies" is "3".

On the other hand, if NO in step S502, the interpretation selection unit 104 determines that there is no tap interpretation data corresponding to the speech interpretation data. In this case, the interpretation selection unit 104 selects the top-ranked speech interpretation data candidate (SS04).

When one of the N speech interpretation data candidates is selected by the processing in step S503 or S504, the interpretation selection unit 104 clears both the speech and tap interpretation stacks (S505).

The GUI (display unit 105) displays the result of the above-described processing.

As described above, this embodiment allows to appropriately compensate speech recognition errors and obtain correct interpretation by integrating tap input with speech input. That is, in a UI to set a plurality of items, any risk of inputting an undesired value to an undesired item by a recognition error is avoidable while taking the advantage of speech input, i.e., inputting at least one item by one utterance.

Modification to First Embodiment

If tap interpretation data corresponding to speech interpretation data is not present, the interpretation selection unit 104 of the first embodiment selects the top-ranked speech interpretation data candidate in step S504 in FIG. 5. In this case, it is also possible to determine the speech input and tap input conflict and reject the input. More specifically, if there is no tap interpretation data corresponding to speech interpretation data, a voice message "Recognition has failed. Please input again" may be output to promote the user to input again.

Second Embodiment

The second embodiment of the present invention will be described below in detail. In the second embodiment, setting of copy processing in a copy machine is done by speech input and touch panel input, as in the above-described first embodiment. Especially as a feature, in searching for a speech recognition grammar on the basis of the feature parameter of input speech, candidates are narrowed down by tap input.

Figure 13:
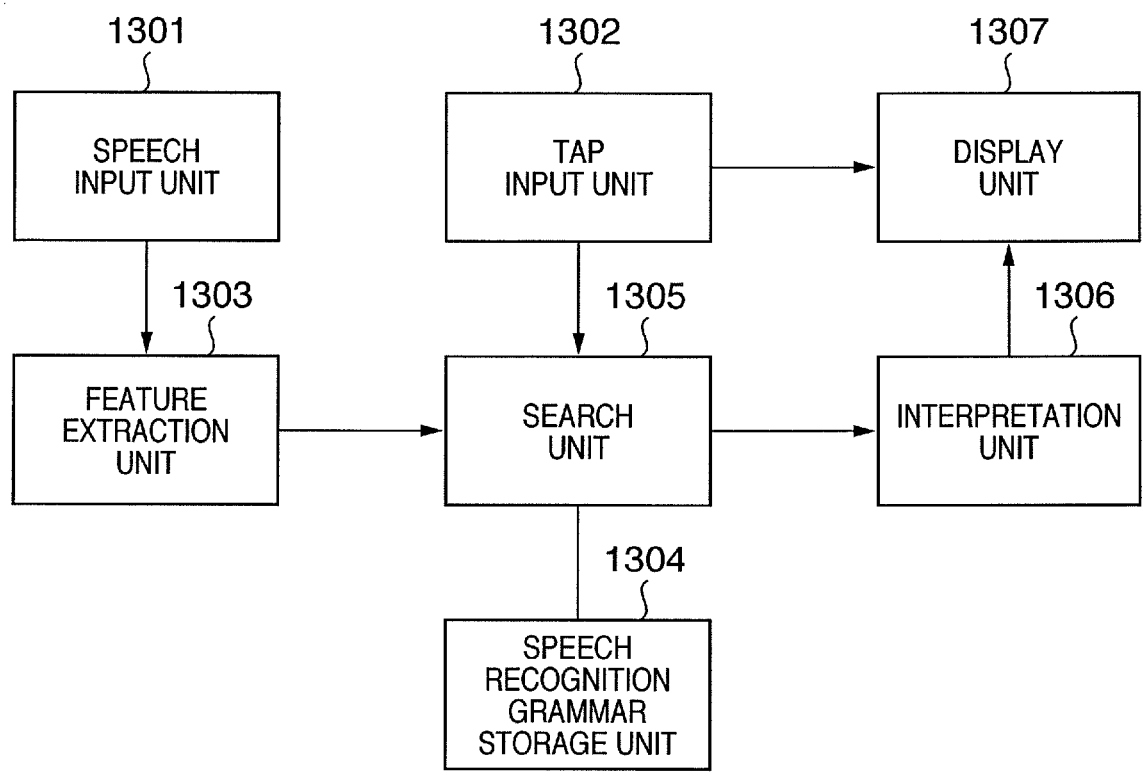
FIG. 13 is a block diagram showing the arrangement of a multimodal input section in a copy machine according to the second embodiment.

FIG. 13 is a block diagram showing an arrangement of a multimodal input processing section in a copy machine according to the second embodiment. Referring to FIG. 13, reference numeral 1301 denotes a speech input unit; 1302, a tap input unit; and 1307, a display unit that controls GUI display. These components are the same as in FIG. 1 of the above-described first embodiment. A feature extraction unit 1303 extracts a feature parameter from input speech. Reference numeral 1304 denotes a speech recognition grammar storage unit. A search unit 1305 selects, from feature parameters, the most appropriate phoneme sequence pattern that matches the speech recognition grammar and outputs it as a recognition result. An interpretation unit 1306 converts the speech recognition result into structured data.

The hardware configuration of the copy machine according to the second embodiment is the same as in FIG. 2 of the above-described first embodiment, and a description thereof will be omitted.

An example will be described in which the user utters "A4, three copies" simultaneously while tapping the "paper size" button and "number of copies" button successively on an LCD 204 that displays GUIs shown in FIGS. 6 to 9, as in the above-described first embodiment.

The speech recognition grammar storage unit 1304 has a description to accept the pattern of simultaneous utterance of two settings for copy processing. Examples of the pattern of simultaneous utterance of two settings are "A4, three copies"
"five copies, single-side to double-side"
"B5, double-side to double-side"
"at 141%, ten copies"
. . .

That is, the pattern inputs two arbitrary values of the four setting items "number of copies", "paper size", "double-side print", and "scaling factor".

Figure 14:
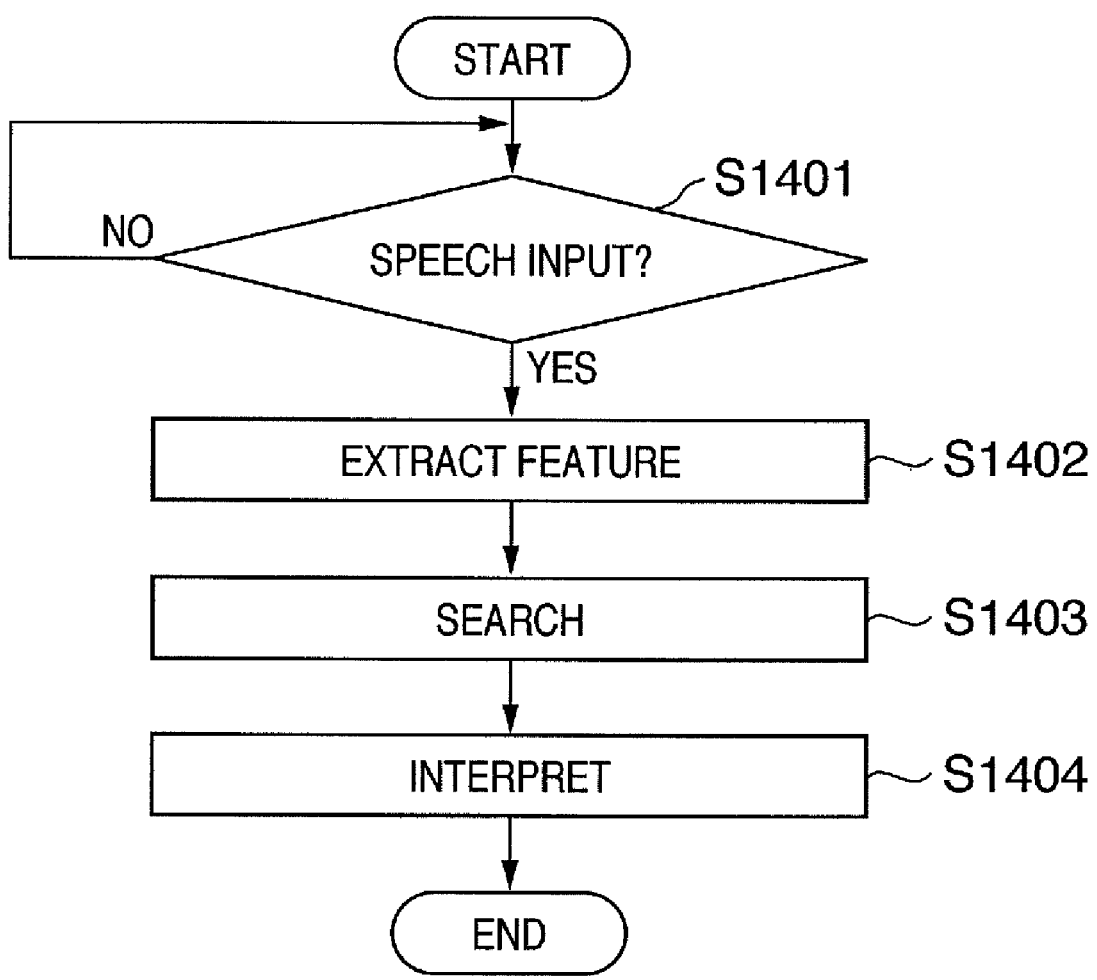
FIG. 14 is a flowchart showing multimodal input processing according to the second embodiment.

FIG. 14 is a flowchart showing the operations of the speech input unit 1301, feature extraction unit 1303, search unit 1305, and interpretation unit 1306.

First the speech input unit 1301 checks whether the user has input speech (S1401). If YES in step S1401, the feature extraction unit 1303 converts the input speech information into a feature parameter string (S1402). A known technique in the speech recognition processing field can implement the conversion to a feature parameter string. Feature parameters such as 01, 02, 03, ..., On are output in chronological order.

Figure 15:
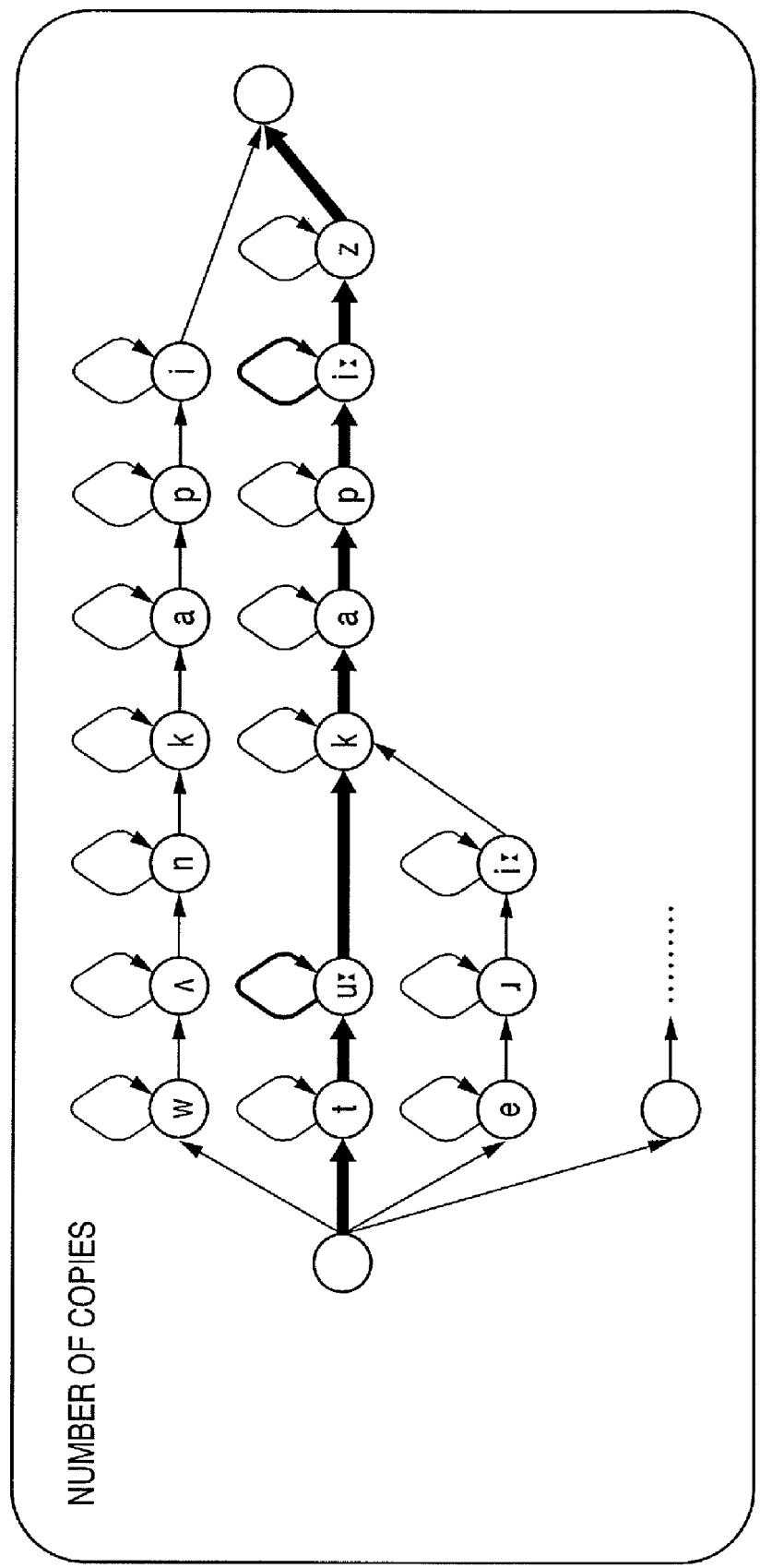
FIG. 15 is a view showing an example of a phoneme sequence corresponding to an utterance for inputting the "number of copies" according to the second embodiment.

The search unit 1305 selects, from the feature parameter string, the most appropriate phoneme sequence pattern that matches the speech recognition grammar stored in advance in the speech recognition grammar storage unit 1304 and outputs it as a recognition result (S1403). For example, assume that the speech recognition grammar is described as a pattern to accept speech input of the number of copies such as "one copy", "two copies", "three copies", . . . In correspondence with this, phoneme sequence data as shown in FIG. 15 is bitmapped on a RAM 202. In the phoneme sequence shown in FIG. 15, the upper, middle, and lower paths represent phoneme sequences "one (W-ʌ-n) copy (k-α-p-i)", "two (t-u·) copies (k-α-p-i·-z)", and "three (θ-ɹ-i·) copies (k-α-p-i·-z)", respectively. The search unit 1305 searches for a phoneme sequence path in FIG. 15, which is closest to the feature parameter string (01, 02, 03, . . . ) output from the feature extraction unit 1303. For example, when the search unit 1305 determines that the middle path indicated by bold arrows in FIG. 15 is closest to the feature parameter string, the user's input speech is recognized as "two copies".

Figure 16:
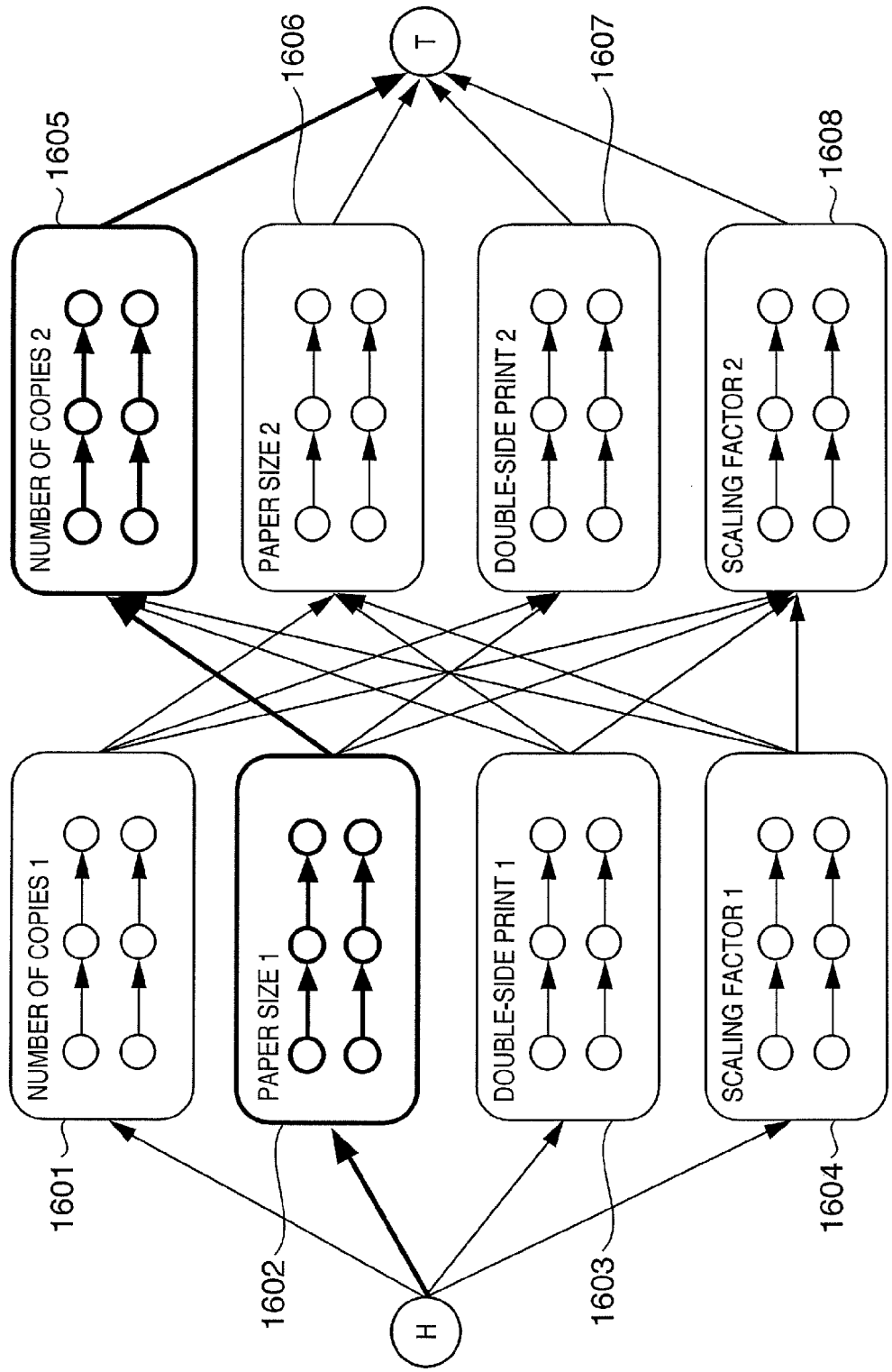
FIG. 16 is a view showing an example of a phoneme sequence corresponding to an utterance for simultaneously inputting two setting items according to the second embodiment.

It is possible to create speech sequences expressing utterance patterns of two setting item values, as shown in FIG. 16, by combining a plurality of phoneme sequences shown in FIG. 15 in series and in parallel. Referring to FIG. 16, for example, phoneme sequences 1601 and 1605 related to the "number of copies" may have the same contents because only the utterance order to be recognized changes. This also applies to the "paper size", "double-side print", and "scaling factor". Two setting values by one utterance can be recognized by calculating the path closest to the feature parameter string. This processing is known in the speech recognition technique, and a detailed description thereof will be omitted.

The user makes an utterance while tapping the "paper size" button and "number of copies" button successively. Hence, the tap input unit 1302 inputs tap information to the search unit 1305 when it is searching for one of the paths in FIG. 16, which is closest to the extracted feature parameter string (01, 02, 03, . . . ).

If the search unit 1305 obtains information representing that the user has tapped the "paper size" button at a given time during path search, the paths passing through a phoneme sequence 1602 of "paper size 1" in FIG. 16 include the correct path. At this point of time, the search unit 1305 excludes the paths passing through the phoneme sequences 1601, 1603, and 1604 of "number of copies 1", "double-side print 1", and "scaling factor 1" from the candidates for further search.

Similarly, when the search unit 1305 obtains information representing that the second tap corresponds to the "number of copies" button, the paths passing through the phoneme sequence 1605 of "number of copies 2" include the correct path. Hence, the search unit 1305 excludes the paths passing through phoneme sequences 1606, 1607, and 1608 of "paper size 2", "double-side print 2", and "scaling factor 2" from the candidates for further search.

The interpretation unit 1306 converts the path found by the search unit 1305, i.e., the speech recognition result into structured data (S1404).

As described above, according to the second embodiment, upon receiving tap information during phoneme sequence pattern search processing, search candidates are narrowed down on the basis of the tap information. That is, the path closest to the feature parameter string is selected from paths matching the tap information. This allows to avoid any setting item input error due to a speech recognition error, as in the above-described first embodiment.

Modification to Second Embodiment

In the above-described example of the second embodiment, a speech recognition grammar to accept the pattern of simultaneous utterance of two settings for copy processing is prepared. The user simultaneously utters two settings and also taps the buttons of the two items.

Instead, the speech recognition grammar may have a description to accept a pattern to input an arbitrary number of settings by one utterance such that the user can simultaneously utter an arbitrary number of settings and also execute tap input an arbitrary number of times. In this case, the search unit selects search candidates matching the first tap information from phoneme sequences connected to a first node H in FIG. 16. The search unit then selects search candidates matching the second tap information from phoneme sequences directly connected to the left phoneme sequences. The search candidates are narrowed down in this way.

<Common Modification>

In the above-described first and second embodiments, when the user taps one of setting item keys such as "number of copies", "paper size", "double-side print", and "scaling factor", a set panel of the item appears on the right side. For example, when the user utters "A4, three copies" simultaneously while tapping the "paper size" button and "number of copies" button successively, the "paper size" set panel and "number of copies" set panel appear on the screen successively.

However, if the user intends input by speech, such panel switching on the screen is meaningless and unnecessarily confuses the user. To solve this problem, a speech input ON/OFF button is provided. The speech input button in the ON state inhibits panel display switching or panel display even upon tapping a setting item key. ON/OFF control of speech input need not always be done explicitly by the key. For example, speech input may be set ON when the speech input unit detects input speech.

The above-described embodiment use speech input and tap input. Any user instruction input means other than speech input is applicable in place of tap input using the touch panel. For example, an operation such as mouse click on the display screen, pressing a predetermined key on the operation unit, or pressing a predetermined key provided on the keyboard is usable together with speech input in place of the tap input described in the embodiments.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention, In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-320009, filed Nov. 02, 2005, which is hereby incorporated by reference herein in its entirety.

What is claimed is:

1. A speech recognition apparatus for allowing setting by speech, comprising:
   an input unit configured to input a setting instruction by speech;
   a speech interpretation unit configured to recognize and interpret contents of the setting instruction by speech to generate first structured data containing candidates of the interpretation result;
   an instruction input detecting unit configured to detect a setting instruction input by a user;
   an instruction input interpretation unit configured to interpret contents of the setting instruction input to generate second structured data; and
   a selection unit configured to select one of the interpretation candidates contained in the first structured data on the basis of the second structured data,
   wherein
   each interpretation candidate contained in the first structured data contains information of a setting item name and a setting value, and
   the second structured data contains information of a setting item name; and
   further comprising:
   a setting window control unit configured to display a setting window corresponding to the setting instruction input when said instruction input detecting unit detects the setting instruction input,
   said setting window control unit inhibiting display of the setting window when said speech input unit inputs the setting instruction.

2. The apparatus according to claim 1, wherein said instruction input detecting unit detects a setting instruction input for an object displayed on a display screen.

3. The apparatus according to claim 1, wherein said selection unit selects, from the interpretation candidates contained in the first structured data, interpretation candidates containing a setting item name matching the setting item name contained in the second structured data.

4. The apparatus according to claim 1, wherein
   each interpretation candidate contained in the first structured data further contains likelihood information of the interpretation result, and
   said selection unit selects, from the interpretation candidates in the first structured data, which contain the setting item name matching the setting item name contained in the second structured data, an interpretation candidate of a highest rank of the likelihood information.

5. The apparatus according to claim 4, wherein said selection unit selects the interpretation candidate of the highest rank of the likelihood information when no interpretation candidate can be selected from the first structured data on the basis of the second structured data.

6. The apparatus according to claim 1, wherein each of the first and second structured data contains a start time and an end time of the setting instruction input.

7. The apparatus according to claim 6, wherein
   said instruction input interpretation unit holds a plurality of second structured data generated, and
   said selection unit selects the second structured data corresponding to the first structured data on the basis of a start time and an end time of the setting instruction input contained in the first structured data.

8. The apparatus according to claim 1, wherein said selection unit rejects input by said speech input unit and notifies a user when no interpretation candidate can be selected from the first structured data on the basis of the second structured data.

9. The apparatus according to claim 1, further comprising a setting unit configured to set the speech recognition apparatus on the basis of the interpretation candidate selected by said selection unit.

10. A speech recognition apparatus for allowing setting by speech, comprising:
    an input unit configured to input a setting instruction by speech;
    a speech interpretation unit configured to recognize and interpret contents of the setting instruction by speech to generate first structured data containing candidates of the interpretation result;
    an instruction input detecting unit configured to detect a setting instruction input by a user;

an instruction input interpretation unit configured to interpret contents of the setting instruction input to generate second structured data; and a selection unit configured to select one of the interpretation candidates contained in the first structured data on the basis of the second structured data, wherein each interpretation candidate contained in the first structured data contains information of a setting item name and a setting value, and the second structured data contains information of a setting item name; and further comprising:

a setting window control unit configured to display a setting window corresponding to the setting instruction input when said instruction input detecting unit detects the setting instruction input, and a speech input switching unit configured to switch ON/OFF of the setting instruction input by said speech input unit, said setting window control unit inhibiting display of the setting window when said speech input switching unit indicates speech input ON.

11. A method for setting a device by using speech recognition, comprising the steps of:

inputting a setting instruction by speech;

recognizing and interpreting contents of the setting instruction by speech to generate first structured data containing candidates of the interpretation result;

detecting a setting instruction input by a user;

interpreting contents of the detected setting instruction input to generate second structured data; and selecting one of the interpretation candidates contained in the first structured data on the basis of the second structured data, wherein each interpretation candidate contained in the first structured data contains information of a setting item name and a setting value, and the second structured data contains information of a setting item name; and further comprising:

controlling by a processing unit to display a setting window corresponding to the setting instruction input when said detecting detects the setting instruction input, said controlling inhibiting display of the setting window when said inputting inputs the setting instruction by speech.

12. A computer program stored on a computer-readable medium for setting device options using speech recognition, the program comprising code for performing the following steps of:

inputting a setting instruction by speech;

recognizing and interpreting contents of the setting instruction by speech to generate first structured data containing candidates of the interpretation result;

detecting a setting instruction input by a user;

interpreting contents of the detected setting instruction input to generate second structured data; and selecting one of the interpretation candidates contained in the first structured data on the basis of the second structured data, wherein each interpretation candidate contained in the first structured data contains information of a setting item name and a setting value, and the second structured data contains information of a setting item name; and further comprising:

controlling to display a setting window corresponding to the setting instruction input when said detecting detects the setting instruction input, said controlling inhibiting display of the setting window when said inputting inputs the setting instruction by speech.

* * * * *